United States Patent
Shie et al.

(10) Patent No.: US 6,259,562 B1
(45) Date of Patent: *Jul. 10, 2001

(54) DEVICE INCLUDING AN OPTICAL ELEMENT WITH AN INTEGRAL SURFACE DIFFUSER

(75) Inventors: Rick L. Shie, Westlake Village; Jeffrey A. Laine, Redondo Beach; Gajendra D. Savant, Torrance, all of CA (US)

(73) Assignee: Physical Optics Corporation, Torrance, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/139,444

(22) Filed: Aug. 25, 1998

(51) Int. Cl.[7] ............................. G02B 13/20; G02B 5/02
(52) U.S. Cl. ............................. 359/599; 359/15; 359/16; 359/19
(58) Field of Search ............................. 359/16, 19, 599, 359/15, 175, 201

(56) References Cited

U.S. PATENT DOCUMENTS

| | | | |
|---|---|---|---|
| 4,427,265 | 1/1984 | Suzuki et al. . | |
| 4,447,123 | 5/1984 | Page et al. . | |
| 4,586,781 | * 5/1986 | Gunther | 359/15 |
| 5,151,917 | * 9/1992 | Perilloux | 372/102 |
| 5,534,386 | * 7/1996 | Petersen | 430/320 |
| 5,538,674 | * 7/1996 | Nisper | 264/1.31 |
| 5,592,332 | 1/1997 | Nishio et al. . | |
| 5,633,762 | * 5/1997 | Richard | 359/817 |
| 5,659,413 | 8/1997 | Carlson | 359/172 |
| 5,751,869 | 5/1998 | Li et al. | 385/33 |
| 5,754,278 | * 5/1998 | Kurtz | 355/67 |
| 5,850,300 | * 12/1998 | Kathman | 359/9 |
| 5,956,106 | * 9/1999 | Petersen | 359/15 |
| 6,023,367 | * 2/2000 | Kurtz | 359/362 |

OTHER PUBLICATIONS

Waveguide Holograms Replace External Laser Optics, Laser Focus World, Dec. 1996, p. 22.
Goodman, Introduction to Fourier Optics, McGraw Hill, p. 49–50, May, 1968.*
Shagam, R.N., Ph.D., "Light Shaping Diffusers™ Simplify Aircraft Inspection," Photonics Spectra, Nov. 1994.
Dusinberre, B., "Light Shaping Diffusers Enhance Depth--Finder Performance," Laser Focus World, Jun. 1995.
Szczesniak, S., & Shie, R., "Machine Vision for Semiconductor Manufacture," Photonics Spectra, Nov. 1995.
"Directional Turning Film™ ", Physical Optics Corporation, 1996, Brochure.
Giancola, S., "Hologrpahic Diffuser Makes Light Work of Screen Tests," Photonics Spectra, Aug. 1996.
Laine, J., "Mini Display," Design News, Dec. 15, 1997.
"Light Shaping Diffusers® Technical Data Sheet," Physical Optics Corporation, Jul. 1, 1998.
"Light Shaping Diffuser® Transmissive Thin Film Price List," Physical Optics Corporation, May 1, 1998.
"Light Shaping Diffuser® Transmission Kits Price List," Physical Optics Corporation, May 1, 1998.
"Light Shaping Diffuser® Transmission Sheet Price List," Physical Optics Corporation, May 1, 1998.

* cited by examiner

Primary Examiner—Cassandra Spyrou
Assistant Examiner—Leo Boutsikaris
(74) Attorney, Agent, or Firm—Nilles & Nilles, S.C.

(57) ABSTRACT

A device has a carrier and an optical element supported by the carrier. The optical element has a macro-optical characteristic and at least one surface. A light shaping surface microstructure is integral on the surface of the optical element. The microstructure homogenizes, shapes and controls directionality of light emanating from the surface of the optical element to produce a smooth, consistent and continuous pattern of light in a predetermined distribution shape and direction. The optical element can either transmit or reflect light incident on a portion of the device and the optical element.

8 Claims, 1 Drawing Sheet

DEVICE INCLUDING AN OPTICAL ELEMENT WITH AN INTEGRAL SURFACE DIFFUSER

BACKGROUND OF THE INVENTION

1. Field of the Invention

The present invention relates generally to the field of devices that utilize optics, and more particularly to devices having an optical element wherein the optical element has a surface diffuser integral in one of the surfaces of the optical element to improve operation of the devices.

2. Description of the Related Art

There are many types of devices utilizing one or more optical elements such as Fresnel lenses, lenticular lenses, reflective surfaces, polarizers, fiber optics, cylindrical lenses, waveguide filters, grating structures, or other such optical elements. Such devices are useful in an ever growing number of applications. These devices typically utilize light from an ambient source or a beam or path of light from a source wherein the light passes through or hits the optical element in order to change one or more characteristics of the light. Examples of such devices include but are certainly not limited to medical diagnostic devices, illumination lamps, chemical analyzers, optical filters, LED displays and devices, LCD displays and devices, microscopes, spectroscopes, and even laser surgical devices. Each of these devices receives and utilizes light in one form or another and/or transmits light from the device in one form or another in performing its intended function.

All of these devices suffer from a number of deficiencies and disadvantages caused by the type and construction of their respective optical elements. Optical elements accomplish one or more inherent functions to change characteristics of light passing through or hitting the element. Such functions include transmission, reflection, diffraction, refraction, wavelength filtering, dispersion or spreading, collimating, and directing of light utilized by the device. performance of the optical elements is limited by the particular qualities of the source of light and its output characteristics. Such optical elements and hence their respective devices are not capable of substantially improving the quality of the light emanating from a source other than to perform their intended functions.

Each optical element within these devices receives, from a source, light having particular characteristics and then transmits and/or alters the light only as to the particular characteristics of the optical element. None of these devices or optical elements homogenizes the light to provide smooth, consistent light intensity, controls directionality of the light to eliminate scatter or wasted light, and shapes the light to produce a particular distribution shape or envelope.

For example, a fiber optic cable receives light energy at one end and, via a predetermined refractive index of the fiber core and cladding materials, continually and internally reflects the light as it passes through the fiber. Most of the light exits the fiber optic cable at another end in substantially the same form in which it was received (ignoring modal variations). Concave and convex lenses are used in many different applications such as film projectors, microscopes and telescopes to slightly bend light according to the amount of curvature or shape of the lenses and materials utilized to manufacture the lenses. A Fresnel lens includes a plurality of Fresnel optics or structures provided on the surface of the lens to refract light entering the lens in order to collimate and focus light as well as to crudely spread the light passing through the lens.

Many other optical elements are available which perform a particular optical function as well. Most optical elements are not capable of homogenizing or smoothing out the light intensity variations exiting an optical element. Additionally, most optical elements are not capable of controlling the directionality of light exiting the optical element. Also, most optical elements are not capable of defining a particular projected shape or light distribution pattern. No optical element has been capable of performing all three functions at the same time. Consequently, in many known optical elements, a significant amount of light is lost or wasted and, therefore, devices utilizing any such optical elements are also quite inefficient.

The assignee of the present invention has invented and patented diffuser sheets of material which can be applied as a separate layer to optical elements in order to add light homogenizing directing and shaping characteristics to the element. A laminate construction is thus formed including a sheet or layer of diffuser material applied or adhered to a surface of an optical element of a device. One problem with such a construction is that the sheet material is not very durable and may easily be damaged, scratched or otherwise deformed during use. Another problem with such a laminate construction is that the diffuser sheet material may simply peel away from the optical element over time or under some conditions. A more critical problem with such a laminate construction is that the mating surfaces between the two portions of the laminate create an interface that refracts or reflects a portion of light entering the optical element. This can cause a minimum loss of about 4% of the incident light at each mating surface. This light is therefore lost as either being reflected back into the optical element or refracted by the interface of the optical element. This phenomenon affects the efficiency and functioning of the device in which the optical element is installed.

A further problem with such a construction is that an index matching optical grade epoxy or adhesive must be used in order to adhere the two parts of the laminate together. The optical grade epoxy permits passage of light through itself but creates an additional unwanted refractive or reflective interface in the laminate. Hence, additional Fresnel losses, both between the diffuser layer and the epoxy as well as between the optical element and the epoxy are created in such a laminate construction. The epoxy layer also adds cost to the laminate construction as well as manufacturing complexity.

An additional problem with such an epoxy laminate optical element construction is that there are many instances where the epoxy is not fully and completely in contact with the two layers. Additionally, air bubbles can form in the epoxy or between the epoxy and one of the laminate layers caused by manufacturing process irregularities. Such problems within the epoxy further reduce the efficiency of the laminate construction by scattering, reflecting or refracting light passing within and through the optical element of a device. All of the above problems greatly reduce the performance and desirability of utilizing laminated optical elements within a device.

The assignee of the present invention has invented several ways of forming a micro-sculpted surface structure or a microstructure in various materials to form a surface diffuser on such materials. These methods are described in a number of issued patents and co-pending patent applications listed below. Many of these methods involve creating a master diffuser by exposing a photoresist material to a source of light and then replicating this master diffuser into one or more sub-masters of a more durable nature. There are also other methods of making replicas of a master diffuser which contain the optical features in the master. With some of these methods, the master diffuser is initially created optically. With others, it is created mechanically. Submasters are created from these master diffusers utilizing a number of methods whereby the master diffuser surface is replicated into a sub-master surface. These other methods are described in one or more pending U.S. applications, referenced below, which are assigned to the assignee of the present invention.

Commonly assigned U.S. patents and pending applications disclose related methods for making and recording optical products and replicating those products so that they may be mass produced. For example, U.S. Pat. No. 5,365,354 lentitled "Grin Type Diffuser Based on Volume Holographic Material," U.S. Pat. No. 5,534,386 entitled "Homogenizer Formed Using Coherent Light and a Holographic Diffuser," and U.S. Pat. No. 5,609,939 entitled "Viewing Screen Formed Using Coherent Light," all owned by the present assignee relate to methods for recording and replicating optical products. Each of these U.S. patents is incorporated herein by reference for purposes including, but not limited to, indicating the background of the present invention and illustrating the state of the art.

Related U.S. patent applications include Ser. No. 09/052,586 entitled "Method of Making Replicas While preserving Master," Ser. No. 08/595,307 entitled "LCD With Light Source Destructuring and Shaping Device," Ser. No. 08/601,133 entitled "Liquid Crystal Display System with Collimated Backlighting and Non-Lambertian Diffusing," Ser. No. 08/618,539 entitled"Method of Making Liquid Crystal Display System," Ser. No. 08/800,872 entitled "Method of Making Replicas and Compositions for Use Therewith," and Ser. No. 09/075,023 entitled "Method and Apparatus for Making Optical Masters Using Incoherent Light", "Non-Lambertian Glass Diffuser and Method of Making," filed Aug. 20, 1998, "Diffuser Master and Method of Manufacture," filed Aug. 20, 1998, "High Efficiency Monolithic Glass Light Shaping Diffuser and Method of Making," filed Aug. 25, 1998, "Optical Element Having an Integral Surface Diffuser," filed Aug. 25, 1998, "Apparatus Having a Light Source and a Sol-Gel Monolithic Diffuser," filed Aug. 25, 1998,"Passive Matrix Liquid Crystal Display," filed Aug. 25, 1998, and "Vehicle Light Assembly Including a Diffuser Surface Structure," filed Aug. 25, 1998. All the above applications are owned by the present assignee and are hereby incorporated by reference for purposes including, but not limited to, indicating the background of the present invention and illustrating the state of the art.

SUMMARY OF THE INVENTION

The present invention is directed to a device including an optical element wherein the element has an integral surface diffuser that homogenizes, controls directionality and shapes the light output for improving performance of the device. An object of the present invention is to provide a device utilizing an optical element that increases the accuracy and efficiency of the device. Another object of the present invention is to provide a device utilizing an optical element that improves the light homogenization, directionality control and shaping characteristics for operation of the device at a reduced cost and complexity. A further object of the present invention is to provide a device utilizing an optical element that has improved durability and quality.

These and other objects of the invention are met by a device constructed according to the present invention. A device has a carrier and an optical element supported by the carrier. The optical element has at least one macro-optical characteristic, at least one surface, and a light shaping micro-sculpted surface structure, herein described as a microstructure, on the surface of the optical element. The microstructure homogenizes light utilized by or transmitted from the device and controls directionality of light to produce a smooth, continuous and predetermined light distribution shape in a predetermined direction for use by the device or provided by the device itself.

The carrier of the invention can be virtually any type of device or portion of a device wherein an optical element is utilized. Examples of carriers and of devices falling within the scope of the present invention include, but are certainly not limited to arthroscopes, endoscopes, telescopes, microscopes, X-ray scanners, magnetic resonance imaging scanners, telecommunication systems, missile guidance systems, vehicle guidance systems, chemical analyzers, spectroscopes, fluoroscopes, illumination lights, LED and LCD displays and devices.

Examples of optical elements which may be utilized in such devices include but are certainly not limited to laser attentuators, waveguide filters, grating structures or filters, fiber optic cables, Fresnel lenses, cylindrical lenses, convex and concave lenses, transparent or translucent plates, polarizers, and prismatic structures.

These and other aspects and objects of the present invention will be better appreciated and understood when considered in conjunction with the following description and accompanying drawings. It should be understood, however, that the following description, while indicating preferred embodiments of the present invention, is given by way of illustration and not of limitation. Many changes and modifications may be made within the scope of the present invention without departing from the spirit thereof and the invention includes all such modifications.

DESCRIPTION OF THE DRAWINGS

A clear conception of the advantages and features of the present invention, and of the construction and operation of the typical mechanisms provided with the present invention, will become more readily apparent by referring to the exemplary and therefore non-limiting embodiments illustrated in the drawings accompanying and forming a part of this specification, and in which.

DETAILED DESCRIPTION OF THE PREFERRED EMBODIMENTS

Figure 1:
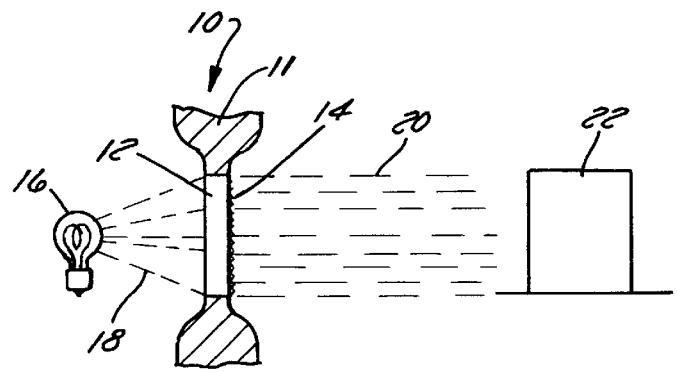
FIG. 1 illustrates a schematic of one embodiment of a device constructed in accordance with the present invention.

According to the above-listed patents and co-pending patent applications assigned to the assignee of the present invention, methods have been developed by the assignee for optically or mechanically creating a micro-sculpted surface structure or microstructure in a substrate. The microstructure is random in nature and produces a light output transmitted through or reflected from the substrate having a smooth, consistent and continuous intensity distribution with controlled directionality and a predetermined distribution shape or envelope. The issued patents noted above are directed to forming the microstructure by various means in a photoresist material and replicating the structure in a sub-master. The sub-master is utilized to further replicate the microstructure into sheets of material. The sheet material may be laminated or otherwise applied to objects in order to provide the light homogenizing, directing and shaping characteristics. The co-pending applications noted above disclose novel products and methods further developed by the assignee for forming the microstructure in materials other than an epoxy and sheets of soft plastic materials.

The present invention is not to be limited to a microstructure formed by any particular manner or formed in any particular material and therefore the optical elements described herein may be formed from such materials as sol-gel glass, quartz glass, polycarbonate and acrylic plastic, epoxy, metal, and any other suitable plastic, glass or other moldable or workable material. The present invention is directed to devices incorporating one or more optical elements that have an integrally formed microstructure in a surface of the element. The monolithic or solid unitary optical elements provided in such products or devices each have both at least one macro-optical characteristic associated with the particular optical element as well as the micro-optical characteristic or diffuser microstructure. Such optical elements greatly improve the quality of the light emanating from the elements and therefore greatly improve performance of the products and devices incorporating the elements.

The addition of an integral surface diffuser microstructure homogenizes, controls directionality, and shapes light emanating from the optical elements according to predetermined and desired criteria. The replacement of a laminated diffuser/optical element construction minimizes or eliminates unwanted Fresnel reflection losses caused by mating surfaces between the laminated diffuser and optical element. Transmission efficiency is therefore increased through the optical elements and hence the efficiency for the associated devices. The cost and complexity of manufacture of the optical elements and hence the devices are reduced as well.

Referring now to the drawings, the figures illustrate a number of exemplary embodiments of generic optical elements having an integral surface microstructure providing improved light propagating characteristics and qualities. The embodiments also illustrate some exemplary generic devices incorporating the optical elements of this particular monolithic construction. The particular examples shown are not intended to exhaust or limit the possible optical element constructions nor device embodiments incorporating such optical elements, but merely are shown to exemplify some of the construction alternatives. Each of the examples illustrates an arrangement of an optical element and a device and the associated light paths for the arrangement.

FIG. 1 illustrates a schematic view of a device 10 incorporating a carrier 11 supporting an optical element 12. The optical element has a light shaping surface microstructure 14 on one of its surfaces which is integrally formed therein according to one or more of the above-noted patents and applications assigned to the assignee of the present invention.

The device has a light source 16 generating a light output 18, some of which is incident upon and transmitted by the optical element. Homogenized, shaped and directed light 20 emanates from the optical element 12 toward a desired work area 22 to perform an intended purpose such as illuminate the work area. The light source 16 in the present embodiment can be any type of light source such as ambient light, light extrinsic of the device, or a light source connected to or carried by the device 10. The type of device and the carrier supporting the optical element can be any type of device, system or apparatus that utilizes such an optical element during its operation. The optical element may be either a transmissive or reflective type, although the element 12 is shown as a transmissive type for the illustration.

Figure 2:
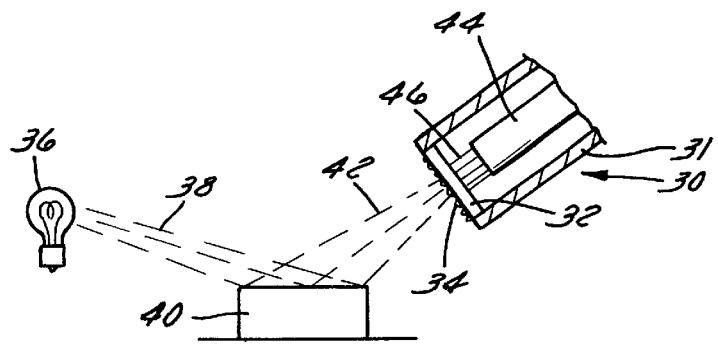
FIG. 2 illustrates a schematic of another embodiment of the present invention.

FIG. 2 illustrates a schematic of another device 30 incorporating a carrier 31 supporting an optical element 32. The optical element has a light shaping surface microstructure 34 integral in a surface of the element. A light source 36 produces a light output 38 directed toward a work area or intended target 40. Light 42 is reflected or otherwise transmitted from the target 40 toward the carrier 31 and the optical element 32. A sensor 44 is supported by a portion of the device 30 such as the carrier 31. Shaped, homogenized and directed light 46 emanates from the optical element 32 and is received by the sensor. The sensor 44 may be of any particular type capable of receiving, reading, storing or transmitting the light 46 for an intended purpose.

The light source 26 can be either ambient light, light extrinsic of the device 30 or a light source connected to or integrated with the device. The optical element 32 can be any type of transmissive or reflective optical element. The device 30 and the carrier 31 can be any type of device, system or apparatus utilizing such a device.

Figure 3:
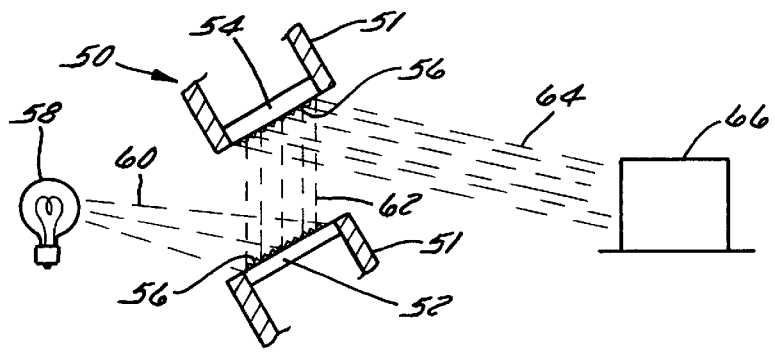
FIG. 3 illustrates a schematic of another embodiment of the present invention.

FIG. 3 illustrates another schematic of a device 50 incorporating a carrier 51 supporting a pair of reflective optical elements 52 and 54. The optical elements 52 and 54 each have a light shaping surface microstructure 56 (not neccessarily the same) integral in surface of the element. A light source 58 produces a light output 60, some of which is incident upon the optical element 52. Shaped, homogenized and directed light 62 reflects from the optical element 52 toward the element 56. Further shaped, homogenized and directed light 64 reflects from the optical element 54 toward a work area or intended target 66.

The construction of the device 50 can vary considerably without departing from the scope of the invention. For example, one or more transmissive optical elements could replace one or more of the reflective elements 52 and 54. One or more transmissive or reflective elements could be added to the device to perform additional functions as needed. The work area can be part of the device such as a sensor or other electronic component that utilizes or transmits the light 64 in one form or another. The light source can again be ambient light, light extrinsic of the device 50, or a light source incorporated as a part of the device. Again, the optical element or elements, the device, and the carrier can vary considerably without departing from the scope of the invention.

Figure 4:
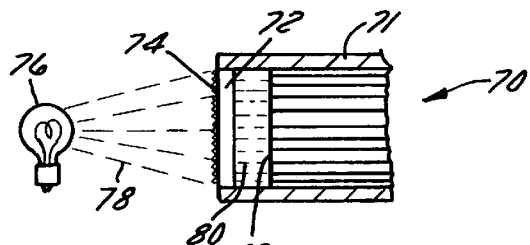
FIG. 4 illustrates a schematic of another embodiment of the present invention.

FIG. 4 illustrates a schematic of another device 70 incorporating a carrier 71 supporting an optical element 72. The optical element has a light shaping surface microstructure 74 integral in a surface of the element. A light source 76 produces a light output 78, some of which is incident upon the optical element 74. Shaped, homogenized and directed light 80 emanates from the optical element 74 and is received by a component 82 of the device. The component 82 can be a sensor or other component that transmits, reads or otherwise utilizes the light 80 to perform a function of the device 70.

The light source 76 can again be ambient, extrinsic, or incorporated in the device 70. The device in this embodiment can again be any type of device, system or apparatus utilizing such an optical element to perform an intended purpose. The optical element can be any type of reflective or transmissive element without departing from the scope of the invention. This embodiment is different from that shown in FIG. 2 in that there is no intermediate target, object or other medium between the source 76 and the optical element 72 here, as there is in FIG. 2.

The particular device can vary considerably without departing from the scope of the invention. Such devices include but are not limited to medical diagnostic equipment such as an arthroscope, an endoscope, a blood analyzer, a laser surgical apparatus, a microscope, a surgical or operating room lamp, or other medical equipment. The device may be a high technology imaging system for guiding missiles or locating targets in the dark. The device may be as simple as an LED display for a sign, a hand held game, or other display screen illuminator. The device can be a laser generator wherein the optical element is a laser attenuator. The device can be any type of camera or other imaging apparatus, a microscope, or a high power telescope. The performance of virtually any device utilizing an optical element will be significantly improved if constructed according to the invention. The carrier of the invention can be virtually any part, component system or sub-system of one of these devices.

The type of optical element is also not to be limited by the present invention. The optical element can include but is also not limited to laser attenuators, waveguide filters, grating structures or filters, fiber optic cables, Fresnel lenses, cylindrical lenses, convex and concave lenses, transparent or translucent plates, polarizers, and prismatic structures. Each of these elements performs one or more macro-optical function on light incident on or propagating through the element. Virtually all of these optical elements significantly benefit from having an integral diffuser microstructure incorporated therein that shapes, homogenizes and controls directionality of light. Devices relying on the performance of such optical elements therefore also greatly benefit.

Though the invention has been described referring to particular embodiments, many other changes and modifications may be made to the invention as described without departing from the spirit and scope thereof. The scope and spirit of these changes will become apparent from the appended claims. The scope of the invention is therefore intended to be limited only by the appended claims.

What is claimed is:

1. A device comprising:

a hollow carrier having an open end portion;

an optical element captively retained by the open end portion of the carrier, wherein the optical element includes a macro-optical characteristic and defines at least one surface;

wherein the optical element further includes a light shaping surface microstructure that is random in nature and integral with said surface of the optical element;

a light source, spaced from the microstructure, for producing output light;

a light-reflective target interposed between the light source and the carrier, wherein the target includes a light-reflective surface that is so disposed relative to the light source and the microstructure as to reflect output light from the light source toward the microstructure;

wherein the random nature of the microstructure enables the optical element to homogenize incident light transmitted through the optical element and into the carrier, and wherein the random nature of the microstructure additionally enables the optical element to shape and control directionality of said incident light transmitted through the optical element, thereby to produce in the carrier a smooth, continuous pattern of light in a predetermined distribution shape and direction.

2. The device of claim 1, further comprising:

a sensor disposed within the hollow carrier for transmitting, for a preselected purpose, the incident light transmitted through the optical element.

3. A device comprising:

a hollow carrier having an open end portion;

a light-reflective optical element captively retained by the open end portion of the carrier, wherein the optical element includes an integral light-reflective macro-optical characteristic which defines an exterior surface of the optical element;

wherein the light-reflective optical element further includes a light-shaping surface microstructure that is random in nature and integral with said exterior surface of the light-reflective optical element, wherein the random nature of the microstructure enables the light-reflective optical element not only to homogenize incident light which is reflected from the exterior surface of the light-reflective optical element external to the carrier but also to shape and control directionality of said light, thereby to produce external to the carrier a smooth, continuous pattern of light in a predetermined distribution shape and direction.

4. The device of claim 3, further comprising:

a light source, spaced from the microstructure, for producing output light;

a second light-reflective optical element having a light-reflective exterior surface, wherein the second optical element is so disposed relative to the light source and the carrier as to reflect said incident light from the light source toward the microstructure.

5. The device of claim 4, wherein the second light-reflective optical element separately includes said random light-shaping surface microstructure, and wherein said separately-included microstructure is integrally formed on the light-reflective exterior surface of said second optical element.

6. The device of claim 1, wherein the incident light is ambient light.

7. The device of claim 2, wherein the sensor is adapted to receive, read, store, or transmit the light.

8. The device of claim 3, wherein the incident light is ambient light.

* * * * *